V. A. HELLSTROM.
BREAD MAKING MACHINE.
APPLICATION FILED OCT. 25, 1909.
969,058.
Patented Aug. 30, 1910.
3 SHEETS—SHEET 1.
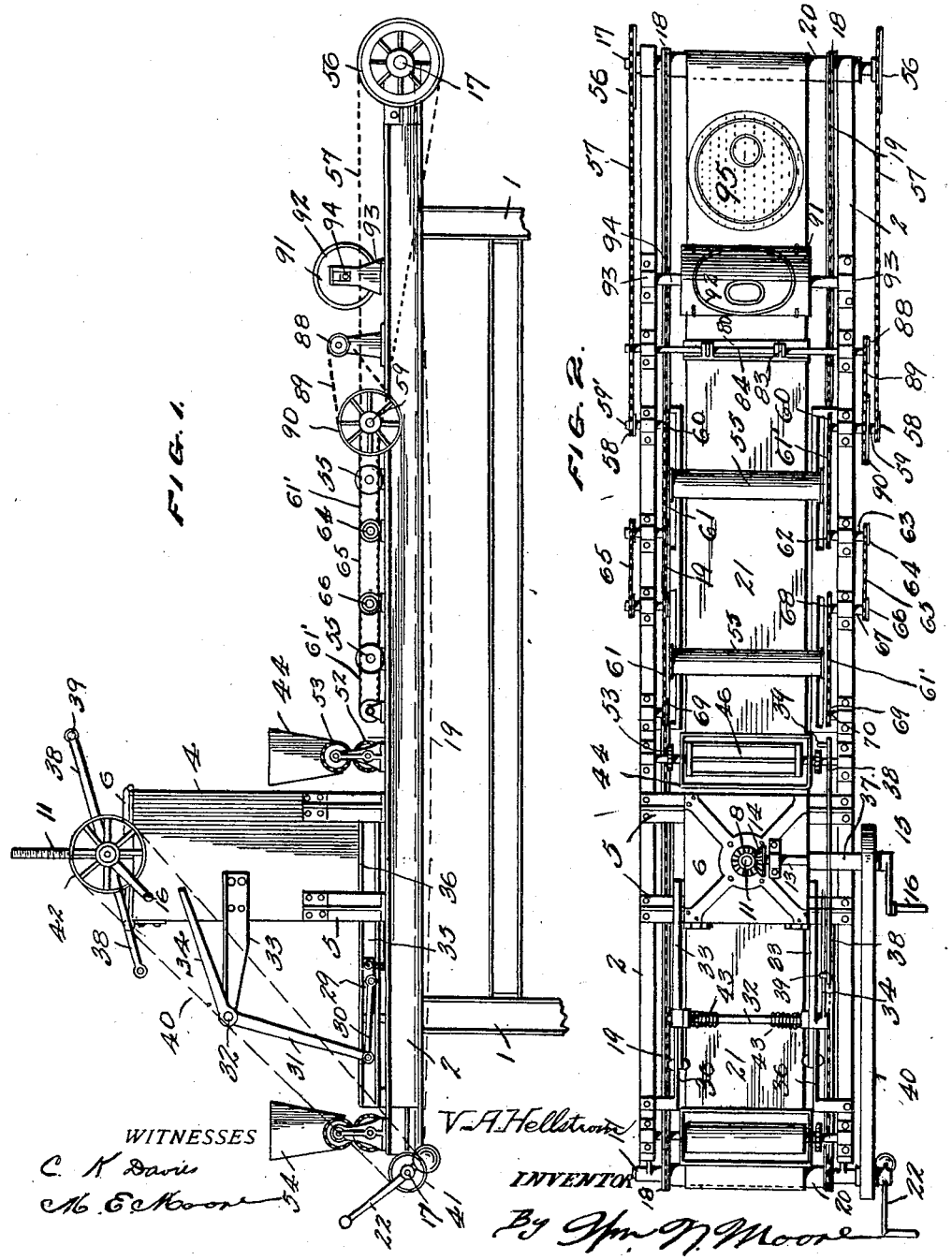

V. A. HELLSTROM.
BREAD MAKING MACHINE.
APPLICATION FILED OCT. 25, 1909.
969,058.
Patented Aug. 30, 1910.
3 SHEETS—SHEET 2.
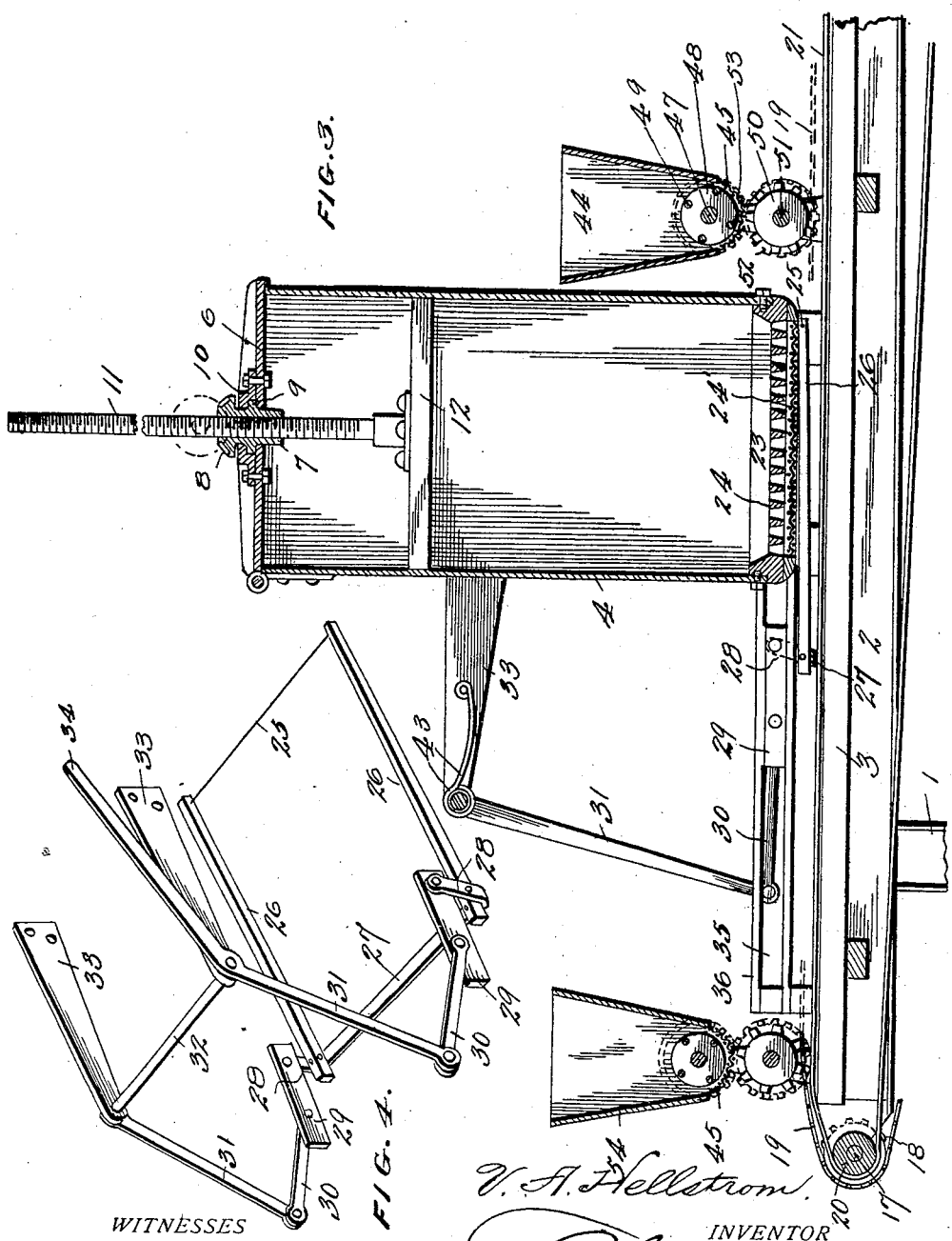

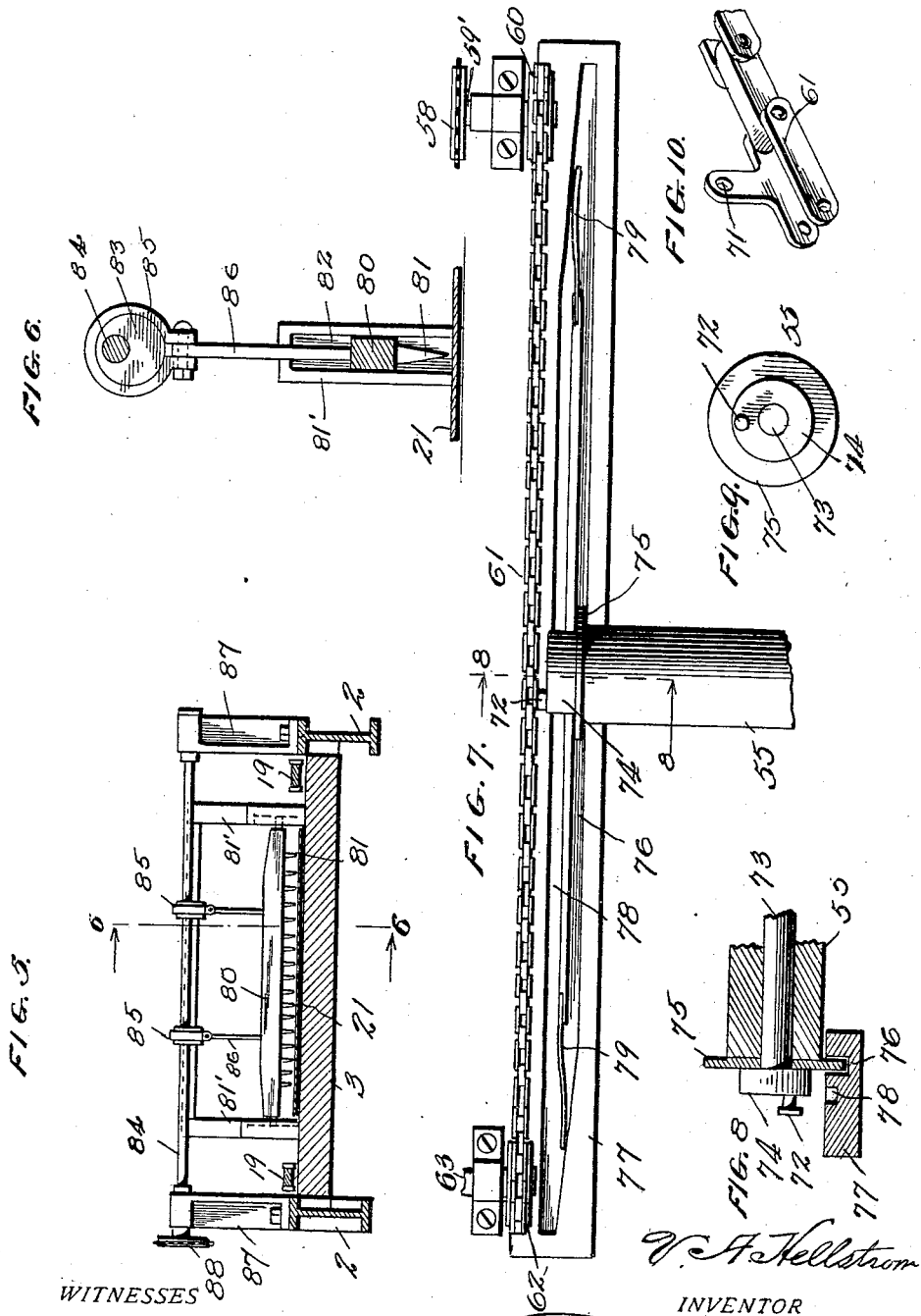

UNITED STATES PATENT OFFICE.

VICTOR ARVID HELLSTROM, OF SALT LAKE CITY, UTAH.

BREAD-MAKING MACHINE.

969,058.   Specification of Letters Patent.   Patented Aug. 30, 1910.

Application filed October 25, 1909. Serial No. 524,387.

*To all whom it may concern:*

Be it known that I, VICTOR ARVID HELLSTROM, an applicant as citizen of the United States, residing at Salt Lake City, in the county of Salt Lake and State of Utah, have invented certain new and useful Improvements in Bread-Making Machines, of which the following is a specification.

The present invention relates to improvements in bread making machines, and is designed particularly for forming a staple article of food known as Swedish rye bread, which is usually made in the form of a flat disk shaped cake, approximately ten to twelve inches in diameter and about one quarter inch in thickness. The cake or loaf is preferably perforated with small holes or indentations, and when baked is dried until crisp.

The object of the invention is the provision of a machine which will efficiently and rapidly handle the soft dough that is of necessity required in the production of the above named loaves or cakes.

The invention consists essentially in a traveling apron upon which a sufficient quantity of soft dough may be deposited, and devices and mechanisms for distributing flour on the apron and on the dough cakes, rolling out the cakes to the required thickness, perforating the cakes, and finally cutting or trimming the blank to the desired pattern. These operations are accomplished while the dough is traveling through the one machine, and the cakes or loaves are produced in continuous succession when the machine is actuated by suitable power. The machine as illustrated in the drawings is manually operated, but it will be understood that other motive power may be applied thereto if desired.

The invention further consists in certain novel features and constructions for actuating the above mechanisms and devices, as will be more specifically referred to hereinafter.

In the accompanying drawings I have illustrated one example of the physical embodiment of my invention constructed according to the best mode I have so far devised for the practical application of the principles.

Referring to the drawings: Figure 1 is a side elevation of the complete machine, part of the frame being broken away for convenience in illustration. Fig. 2 is a plan view of Fig. 1. Fig. 3 is an enlarged view, partly in section, of the front end of the machine, showing particularly the dough box, dough cutter, flouring boxes, etc. Fig. 4 is a detail perspective view of the dough cutting device and operative parts. Fig. 5 is a transverse section of the machine, showing the perforating device. Fig. 6 is an enlarged sectional view on line 6—6 of Fig. 5. Fig. 7 is an enlarged detail plan view of one side of the tracks in which the cake roller travels, showing also one end of a roller. Fig. 8 is a broken sectional view on line 8—8 Fig. 7. Fig. 9 is an end view of one of the cake rollers, and Fig. 10 illustrates a portion of one of the link belts showing the means for attaching a cake roller to such belt.

The entire machine is supported upon a frame 1 of suitable construction which embodies a pair of longitudinal beams 2, between which the table 3 is supported. A dough box 4 is supported on the beams by means of the angle braces 5, said box or receptacle being adapted to hold a sufficient quantity of soft dough, from which the cakes or loaves are to be made.

The dough receptacle is provided with a hinged cover 6, perforated at its center for the reception of the sleeve 7 of the bevel wheel 8. The sleeve is formed with an annular flange 9 which forms, together with the bearing plate 10, a thrust bearing for the bevel wheel 8. The sleeve is interiorly threaded to mesh with the screw bar 11 of the plunger head 12.

The plunger is forced down through the medium of a counter-shaft 13 by the following mechanism which comprises the bevel gear 14, hand wheel 15 and handle 16 thereon. Revolving the wheel by means of the handle rotates the bevel wheels, and inasmuch as the wheel 8 is supported and held against thrust movement, its rotation causes the screw bar to move vertically in direction depending upon the rotation of the shaft 13. As illustrated in Fig. 3, the plunger is movable with the hinged cover or top of the dough receptacle, for convenience in supplying dough to the receptacle.

At each end of the frame 1 and just beyond the ends of the table are supported shafts 17, each provided with a pair of sprocket wheels 18, over which the pair of endless link belts or chains 19 pass, for the purpose of actuating operative devices and contrivances on the machine. Each shaft 17 is equipped with a roller 20 over which the apron or canvas belt 21 travels due to friction of the parts. The shaft 17 at the front of the machine may be rotated by means of the weighted crank handle 22, which in turn moves the pair of link belts 19 through the sprockets, and the apron or canvas belt 21 through the medium of the rollers 20.

The apron 21 passes under the open end or bottom of the dough receptacle. At its lower end the receptacle is provided with a die 23 formed with grate bars 24 between which the dough passes in its exit from the box. The die is preferably sectional, the upper section being bolted to the lower end of the dough receptacle, and the lower section being secured to the upper section and provided with a foraminous plate or wire screen 24'. By means of this construction of box bottom I am enabled to support the dough and regulate its discharge, and the wire screen retards the movement of the descending dough, when compressed by the plunger.

Through the plunger and its actuating mechanism the dough is forced through the bottom of the dough receptacle, and as it emerges therefrom, is cut in the form of a thin sheet. For this purpose I preferably use a wire cutter 25 which is supported between the two arms 26, 26. The opposite ends of these arms are connected by the cross brace 27 and secured thereto. Each end of the transverse arm 27 is formed as a turned-up bracket 28 in which a slide block 29 is journaled. Each of the slide blocks is connected by link 30 to a lever 31, which levers 31 are secured on the cross bar 32 which is supported in the brackets 33 secured to the dough box or receptacle. Preferably one of the levers 31 is provided with an arm or extension 34 by means of which the device is operated.

The cutting mechanism thus described is arranged to reciprocate as shown in Fig. 3, wherein the slide blocks 29 are adapted to move in the slots 35 of the side plates 36 which are stationary and supported on the frame of the machine.

The cutting device is actuated through lever arm 34 in conjunction with a rotating mechanism supported on the counter shaft 13. A sleeve 37 is loosely supported to revolve on this shaft, and with it the two arms 38 carried thereby. These arms 38 have antifriction devices 39, which form contact pieces or abutments, secured at their ends. The sleeve is rotated from the drive shaft 17 by means of a belt or chain, a belt 40 being illustrated in this instance which passes over wheel 41 on shaft 17 and wheel 42 integral with the sleeve 37. As the devices 39 travel in a circle they strike on the extension 34, which is located in their paths of movement. The arms travel clockwise, strike under the extension, and raise and rotate the lever arm 34 which lowers and swings the arms or levers 31, which, through the connecting links 30 and slide blocks moves the cutting device to the position shown in Fig. 3, with the wire 25 in position to slice off a portion of the dough projecting through the screen in the lower end of the dough box. As the contact device 39 passes away from the extension 34, a strong coiled spring 43 supported on bar 32 and having its ends attached to the bracket 33 and bar 32 respectively, retracts the levers 31 and moves the wire 25 with a jerk and rapid motion through the protruding dough, thus severing a portion sufficient to form a cake or loaf. As the machine is operated this reciprocation of the dough cutter is continuous, and portions of the protruding dough are cut off in succession, the plunger being forced down at intervals to supply dough through the screen. As the slice of soft dough is severed it is deposited neatly upon the traveling apron, and moves to the right in Figs. 1 and 2.

When the cake or loaf emerges from under the dough receptacle it passes under a flour box 44 which has an open screened bottom 45, and in which a rotating flour "beater" 46 is supported. This beater is supported on a shaft 47 and comprises the two heads 48 and connecting bars or rods 49. The shaft 47 is rotated from one of the link belts 19 by means of the sprocket wheel 50, shaft 51 and gear wheels 52, 53, as shown. The rotation of shaft 47 turns the beater, and the flour is "dusted" through the screen upon the passing cake or loaf. A similar flour box 54, supported, and operated in like manner as the box or distributer 44, is situated at the opposite side of the dough box, or at the front of the machine, to distribute flour over the canvas apron, and upon which the cake is deposited from the dough box. After being "dusted" with flour the cake passes under a pair of rollers 55 which are caused to move back and forth, as will be described. Only one movement of the rollers is effective on the passing cake, i. e. the forward movement, or their movement toward the dough box or receptacle. The rollers are thus caused to pass over the cake in a direction opposite to the movement thereof and "roll out" the cake to the desired thickness. The return movement of the rollers being through an elevated path and out of contact with either the apron or a passing cake. To accomplish this movement of the rollers I attach at the rear end of the machine two sprocket wheels 56 which are journaled on one of the shafts 17. A pair of sprocket chains 57 connect these wheels with smaller wheels 58 journaled counter shafts 59 and 59'. These shafts each carry an inner sprocket wheel 60 over which passes the chains 61, 61', the other end of the chain being supported on wheel 62 on stub shaft 63. Shaft 63 is provided with a sprocket 64 over which passes the chain 65 to and over the sprocket 66 supported on stub shaft 67. A second operating link belt 61' passes over sprocket 68 on shaft 67 and over sprocket 69 on shaft 70.

The two pairs of link belts 61 and 61' are directly connected to the rollers 55, 55 and operate them, as shown in Figs. 7, 8, 9, 10. Referring to said figures, and especially to Fig. 10, it will be seen that one link of chain 61 is formed with an extension 71 and this perforated ear or extension is attached to the pin or stud 72 of the roller 55. Each roller 55 is bored out through its center and the bar or rod 73 passed through the bore. A head 74 is provided at each end of the rod, and this head carries the stud or pin 72 and also clamps a disk 75 thereon. The disk 75 forms, at its outer periphery, an annular flange at each end of the rollers 55, and this flange is adapted to travel in guide slots of different altitude or elevation, during the reciprocal movement of the roller. Thus, during its forward movement, to the left in Fig. 7, the flange travels in the deep slot 76, formed in plate 77 which is stationary on the machine frame. During the return movement of the roller which is an inoperative movement, the flange travels in the shallow slot of groove 78. A pair of spring-guides or switch plates 79 at each end of the grooves serves to guide the flange in its proper track as will be understood. There are two pairs of these grooved plates 77, two pairs of operating link chains, as 61 and 61', and two connecting drive chains 65.

The rollers which are attached to the operating link chains 61 and 61' are carried back and forth by means of said chains as they pass over their respective sprocket wheels, and the loose rollers on their shafts or rods 73 have a rolling contact with the passing cake or loaf as the rollers move to the front of the machine, but are not in contact with the cake in their return movement, due to the travel of the flanges in the grooves as described.

It is desirable to perforate, or form indentations in the cake or loaf, and for this purpose I provide a cam-operated vertically-reciprocating head 80 formed with pointed fingers or projections 81. This head 80 is adapted to reciprocate vertically in the guide posts 81' formed with grooves 82, and supported on the stationary table. The head is reciprocated by means of a pair of eccentrics 83 rotatable with shaft 84, and a pair of straps or yokes 85 pivotally connected with the link bars 86. The shaft 84 is supported in brackets 87 and carries a sprocket wheel 88, which is driven as shown in Fig. 2 by a chain 89 passing over the large sprocket 90 on shaft 59. The cake or loaf passes under the head 80 and the eccentrics cause the pointed head to reciprocate, which movement perforates or indents the passing cake, as desired.

The final operation of cutting or trimming the cake or loaf is accomplished by means of the roller 91 which has on its periphery a cutting pattern 92 which is adapted to enter the soft dough of the cake or loaf and neatly cut or trim the same to its proper shape. This roller is moved by frictional contact with the traveling apron or canvas belt, and is supported from the table by means of brackets 93 in which the shaft 94 is journaled. A completed cake is shown at 95 in Fig. 2, as it emerges from the machine, ready to be taken from the traveling belt.

I have illustrated the dough box as rectangular in cross section and shown therein a complementary die or plunger, but it will be understood that the die forming the bottom of the dough box may be changed to suit the shape required for the cake or loaf. While I have illustrated a pair of rollers 55 it will be understood that I may employ as many as may be found necessary, and I also contemplate the utilization of different patterns on the cake cutting roller.

From the above description taken in connection with the drawings it is evident that I have produced a device which fulfils all the conditions set forth as the purpose of my invention, and I desire it understood that I may make minor changes or alterations therein, without departing from the scope of my claims, as set forth in the following.

Having thus fully described my invention, what I claim as new and desire to secure by Letters Patent is:—

1. The combination in a bread making machine with a dough receptacle, a plunger therein, and a bottom formed with grate bars and a foraminous casing, of an endless carrier, severing means, and reciprocating rollers adapted during their working stroke to traverse a path in direction opposite to the movement of the carrier, and co-act with the latter to roll out the dough.

2. The combination in a bread making machine with a dough receptacle formed with a grated and foraminous bottom, a plunger head in the receptacle provided with a screw bar and a threaded thrust bearing therefor, of an endless carrier, severing means, and reciprocating rollers adapted during their working movement to traverse a path in direction opposite to the movement of the carrier, and co-act therewith to roll out the severed dough.

3. The combination with a dough receptacle formed with a grated and foraminous bottom, a plunger formed with a screw bar and thrust bearing and an integral bevel wheel, means for turning said wheel, severing means, an endless carrier, and rollers traversing a path in direction opposite to the movement of the carrier to roll out the dough.

4. The combination with a dough receptacle and a hinged cover therefor having a plunger stem journaled and movable therein and means for operating said stem and head thereon, a bottom to said receptacle formed with grate bars and a foraminous casing, and a reciprocable cutting device adapted to move across said casing.

5. The combination with a dough receptacle, of a hinged cover therefor, a plunger stem journaled in the receptacle and provided with screw threads, a threaded thrust bearing for said stem, a head on the stem, means for rotating said bearing to move the plunger, a perforated and foraminous bottom for said receptacle, and a reciprocable cutting device adapted to move across said bottom.

6. The combination with a dough receptacle and means for emitting dough therefrom, of a cutting device operating in connection therewith comprising a pivoted frame suspended from brackets on said receptacle and a reciprocable frame provided with a cutting wire, means for moving said frame to operative position, and independent means for actuating the return or cutting movement.

7. The combination with a dough receptacle and means for emitting dough therefrom, of brackets on said receptacle a supporting frame pivotally suspended therein, a reciprocable frame provided with a cutter and pivotally connected to said supporting frame, means for moving the reciprocable frame to operative position, and independent means for actuating the return or cutting movement.

8. The combination with a dough receptacle of a reciprocable frame carrying a cutter, means for moving said frame to operative position, and independent means for actuating the return or cutting movement of the cutter.

9. The combination with a dough receptacle of a reciprocable frame carrying a cutting wire, means for moving said frame to operative position, and a spring for actuating the return or cutting movement.

10. The combination with a dough receptacle of a reciprocable frame carrying a cutting wire, levers suitably actuated for moving said frame to operative position, and a spring for inaugurating and continuing the return or cutting movement of the cutter.

11. The combination with a dough receptacle of a reciprocable frame carrying a cutting wire; sliding blocks, connecting links and actuating levers and means for moving said levers to carry the cutter to operative position, and a spring for actuating the return or cutting movement of the cutter.

12. The combination with a traveling apron, a dough box and feed mechanism, of a reciprocally moving roller, endless conveyers therefor, guideways and flanges on the roller moving therein, said guideways being arranged at different levels to cause an operative movement of the roller against the movement of the apron and to render said roller inoperative on its return movement.

13. The combination with a traveling apron, a dough box and feed mechanism, of a reciprocally moving roller, endless carriers therefor, pairs of guideways, flanges on the rollers moving in said guidways, and automatic switch members for throwing the flanges from one pair of guideways into another.

14. The combination with a traveling apron, a dough box and feed mechanism, of a reciprocally moving roller, endless carriers therefor, pairs of guideways, flanges on the rollers moving in said guideways, and spring pressed switch members for throwing the flanges from one pair of guideways into another.

15. The combination with a traveling apron, a dough box and feed mechanism, of a reciprocally moving roller, endless conveyers therefor, guideways arranged in pairs at different levels, flanges on the rollers moving in one of the pairs of guideways, and spring switch members for throwing the flanges from one pair of guideways into another.

In testimony whereof I affix my signature, in presence of two witnesses.

VICTOR ARVID HELLSTROM.

Witnesses:
HENRY G. KRANTZ,
JOHN F. APPLEQUIST.